Oct. 1, 1968     J. J. H. CROYMANS ET AL     3,404,300
SYNCHRONOUS MOTOR
Filed April 26, 1966
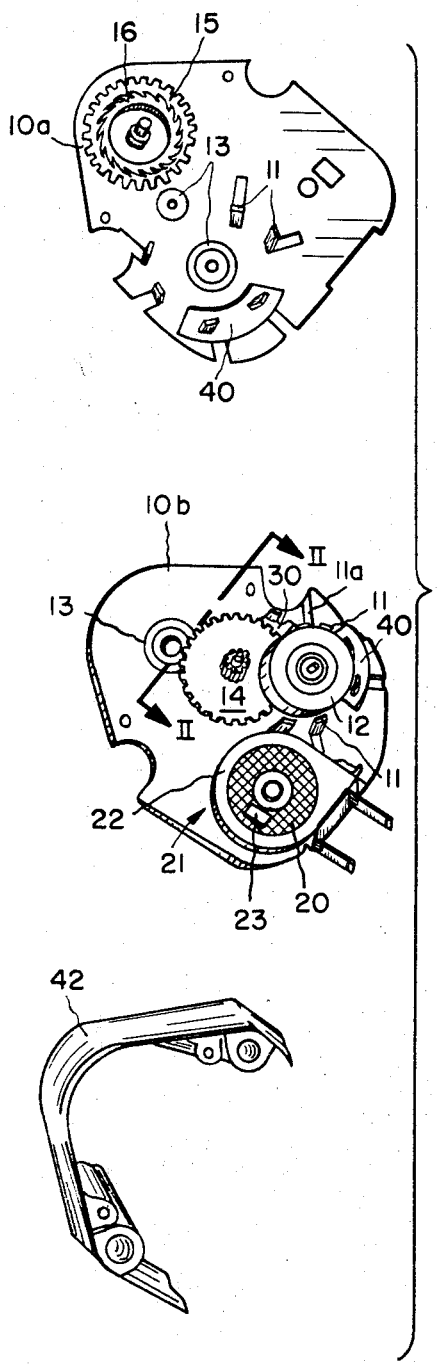
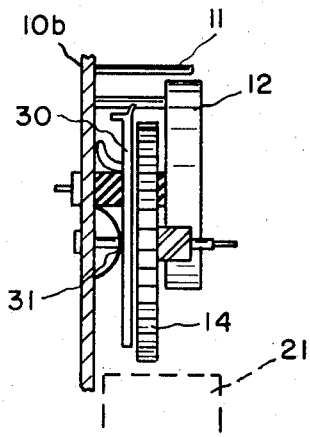
Fig. 2
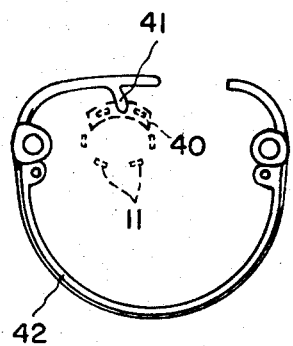
Fig. 3
INVENTORS
JACQUES J. H. CROYMANS
LOUIS A. L. LEBLANS
BY
AGENT United States Patent Office 3,404,300
Patented Oct. 1, 1968

3,404,300
SYNCHRONOUS MOTOR
Jacques Johannes Hendrik Croymans and Louis Adrianus Leopold Leblans, Emmasingel, Eindhoven, Netherlands, assignors to North American Philips Company, Inc., New York, N.Y., a corporation of Delaware
Filed Apr. 26, 1966, Ser. No. 545,483
3 Claims. (Cl. 310—164)

This invention relates to a self-starting synchronous motor provided with a unidirectional drive mechanism which is commonly utilized in the manufacture of clocks, timing devices, control apparatus and similar devices.

Self-starting synchronous motors having an unidirectional drive mechanism are known in various forms from U.S. Patents 2,766,863, 2,788,455, 2,960,201, 3,027,469, 3,200,915, 3,211,933 and 3,231,770, for example.

The motors according to the prior art are relatively expensive because they consist of either one or more parts which are expensive to manufacture and/or assembly of the parts making up the motor is difficult and inefficient.

The primary object of this invention therefore, is to provide a motor of this type made up of a minimum number of parts which are easily and inexpensively manufactured and which require a minimum of handling for efficient assembly without adversely effecting the useful life and reliability of operation of such motors.

The foregoing object and additional objects and advantages will become apparent from the following description of the drawing illustrating the motor according to this invention and in which:

FIG. 1 is a slightly enlarged exploded perspective view of a completely assembled motor according to the invention in which the two motor plates are separated and a wrap around cover is shown in section.

FIG. 2. is an end elevational view of a detail of FIG. 1 taken on line II—II of FIG. 1.

FIG. 3. is a side elevation view of the wrap around cover.

The motor shown in the drawing comprises a pair of side plates 10a and 10b of magnetically conductive material from which the inwardly projecting stator pole pieces 11 are pressed so that when the side plates are brought into assembled position the pole pieces 11 of each plate 10a, b intermesh with one another to define a circular stator cage in which pieces 11 are periodically reversing alternate magnetic poles surrounding a permanent magnet rotor 12 which is peripherally polarized with alternate north and south poles. The plates 10a and 10b are each provided with a suitable journal 13 for the rotor shaft and gear shafts. The journals 13 are made of a non-magnetic material which provides a high reluctance path between plates 10a, 10b to prevent a magnetic short circuit between plates 10a and 10b through the rotor and gear shafts. An intermediate gear 14 and a driven output gear wheel 15, driven by the rotor 12, are each likewise rotatably mounted in a similar pair of non-magnetic journals in the plates 10a and 10b. The journals for the rotating parts 12, 14, 15 are mounted in the side plates in any suitable manner susceptible of mass production techniques, for example, the journal pieces 13 may be press fitted in apertures formed by a punching operation on the side plates 10a and 10b at substantially the same time the rotor pole pieces 11 are pressed from the side plates. Journal pieces 13 may consist of any suitable material such as nylon, Teflon and the like.

A stator winding or field coil 20, of substantially solid cylindrical configuration, is mounted between the side plates 10a, 10b apart from the rotor 12 as shown. The fine wire of the coil 20 is wound on a coil former 21 having side flanges 22 and stand off pads 23, which are preferably integral with the coil former. Pads 23 establish a spacing between the plates 10a, 10b necessary for proper clearance of rotating parts 12, 14, 15. The coil former 21 of course, becomes an integral part of the field coil 20. It will be apparent that by setting a field coil 20 and rotor 12 apart as shown, that the field coil occupies minimum space while providing a coil of a high number of turns while the rotor consists of a sufficient quantity of magnetic material for producing high torque characteristics and at the same time providing an extremely compact, flat, or "pancake" motor.

It will be apparent also that side plates 10a, 10b, simultaneously provide multiple functions i.e. they are the motor frame and gear plates as well as magnetic circuit elements for the stator field poles. The journal inserts 13 while well suited for journal service magnetically insulate each plate 10a, 10b.

The directional drive member 30, is positioned between the intermediate gear 14 and the side plate 10b (FIG. 2) and is freely rotatable about the shaft of the gear 14. A light spring 31 urges the drive member 30 into frictional engagement with the gear 14 so that the member 30 rotates due to friction with the gear 14 until it engages a fixed object. In FIG. 1 clockwise rotation of gear 14 will abut the member 30 against the adjacent pole piece 11a. Counter-clockwise rotation of gear 14 on the other hand, will place member 30 in abutment with the ratchet teeth 16 on the output gear 15. Arresting gear 15 stops the motor momentarily and the rotor then starts turning in the opposite direction in known manner. When the motor rotates in the desired direction (gear 14 turning clockwise) the member 30 is held against the pole 11a in its inoperative position.

As seen in FIG. 1 each set of pole pieces 11 support a shade winding or shade piece 40. The pieces 40 are loose on the pole pieces and are separated by a spacer 41 (FIG. 3) integral with the wrap around housing 42. Housing 42 is preferably moulded of a non-magnetic material i.e. any suitably synthetic resin.

From the foregoing description of the drawing it will be appreciated that the invention provides a compact, flat motor of simple, inexpensive parts for reliable operation and high starting torque.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed as new and useful and secured by Letters Patent of the United States is:

1. A compact high torque self-starting synchronous motor comprising a stator assembly including a pair of opposite side plates of magnetic material, a coil former and field coil between said plates, inwardly projecting pole pieces pressed from each of said plates for intermeshed relationship defining a circular stator cage remote from said field coil; a permanent magnet rotor, having peripheral, alternate magnetic polarity, means journaling said rotor between said plates for rotation within said stator cage, a gear train between said plates driven by said rotor and means coupled with said gear train for preventing movement of said gear train in one direction.

2. A compact high torque self-starting synchronous motor according to claim 1 wherein said means journalling said rotor comprise bearing inserts of non-magnetic material secured on said plates for receiving the rotor shaft.

3. A compact, high torque, self-starting synchronous motor according to claim 2 with the addition of a wrap around cover of non-magnetic material encircling said plates for defining a closed compartment with said plates.

References Cited

UNITED STATES PATENTS

| | | | |
|---|---|---|---|
| 2,234,420 | 3/1941 | Traeger | 310—164 |
| 2,432,070 | 12/1947 | Sanborn | 310—164 |

MILTON O. HIRSHFIELD, *Primary Examiner.*

L. L. SMITH, *Assistant Examiner.*